United States Patent [19]

Coppens

[11] 3,729,983

[45] May 1, 1973

[54] LEAK TIGHTNESS TESTING METHOD AND APPARATUS

[75] Inventor: Mattheus Johannes Martinus Coppens, Heide-Kalmthout, Belgium

[73] Assignee: Inland Steel Company, Chicago, Ill.

[22] Filed: Aug. 27, 1970

[21] Appl. No.: 67,427

[52] U.S. Cl.............................................73/40.7
[51] Int. Cl................................................G01m 3/20
[58] Field of Search......................73/40, 40.7, 49.2, 73/49.3, 52, 38

[56] References Cited

UNITED STATES PATENTS

| | | | |
|---|---|---|---|
| 3,091,114 | 5/1963 | Webster | 73/40.7 X |
| 3,572,096 | 3/1971 | Meyer | 73/40.7 |
| 3,577,769 | 5/1971 | Roberts | 73/40.7 |
| 3,177,704 | 4/1965 | Stange | 73/49.3 |

Primary Examiner—S. Clement Swisher
Attorney—Wolfe, Hubbard, Leydig, Voit & Osann

[57] ABSTRACT

The disclosure relates to methods and apparatus for leak tightness testing of articles such as metal drums wherein the article is placed in a testing enclosure with a detectable gas such as nitrous oxide adjacent one closed side of the article and the space between the other side of the article and the enclosure is evacuated to a pressure lower than the gas pressure on said one closed side of the article. After the test time has passed the entire content of the evacuated enclosure space is flushed to a detector apparatus by an inert gas, preferably air, introduced into the enclosure space at a pressure higher than the pressure to which the space had been evacuated.

11 Claims, 3 Drawing Figures

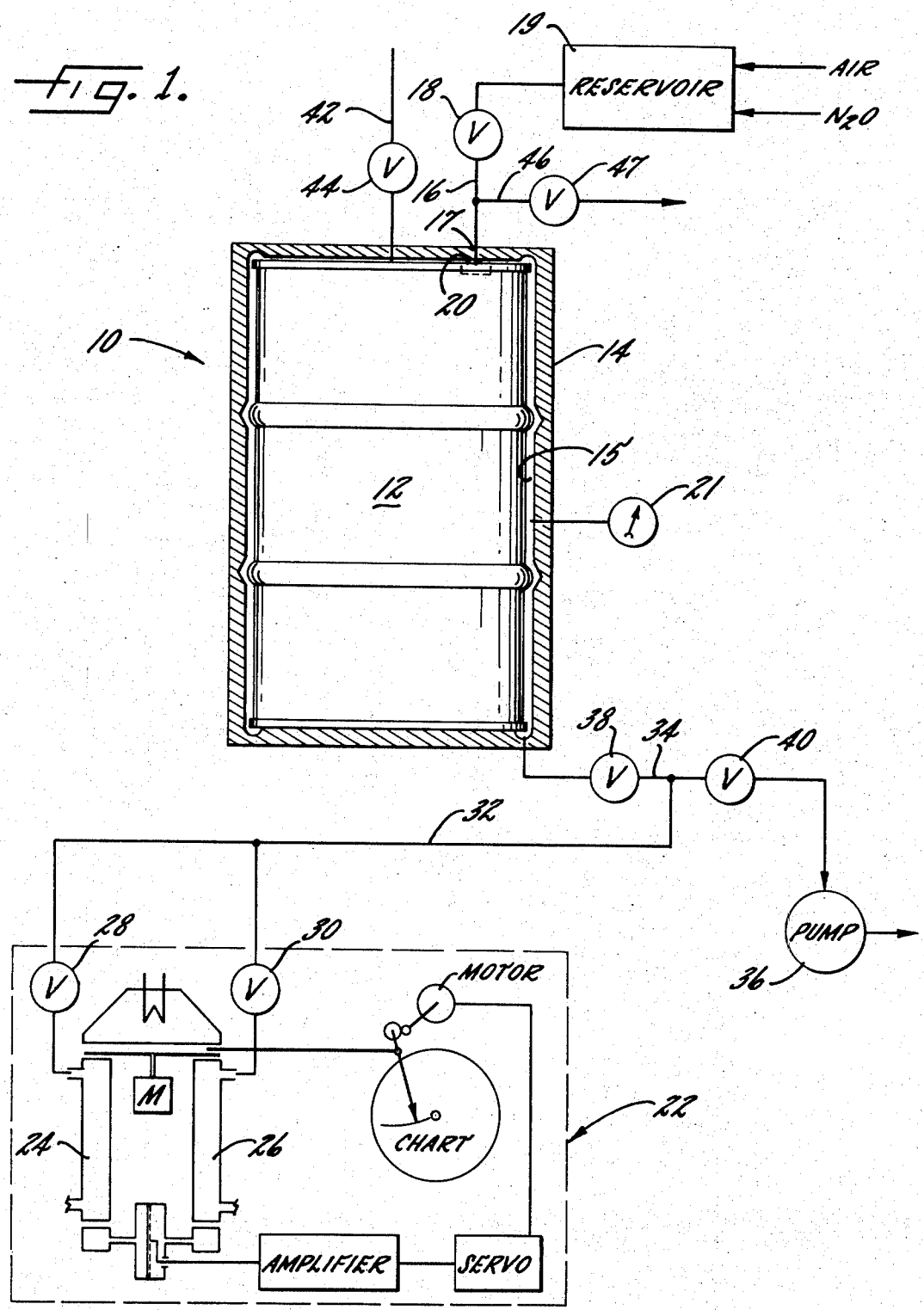

Fig. 2.

| TIME | ENVELOPE 15 | VALVE 38 | VALVE 28 | VALVE 40 | VALVE 18 | VALVE 44 | VALVE 30 | VALVE 47 |
|---|---|---|---|---|---|---|---|---|
| 0 | OPEN | OPEN | OPEN | CLOSED | CLOSED | CLOSED | CLOSED | CLOSED |
| 2 | CLOSED | | CLOSED | OPEN | OPEN | | OPEN | |
| 5 | | CLOSED | | | CLOSED | | | |
| 6 | | | | CLOSED | | | CLOSED | |
| 15 | | OPEN | | | | OPEN | OPEN | OPEN |
| 17 | OPEN | | | | | CLOSED | CLOSED | CLOSED |

TEST CYCLE

Waiting time (t) spans from approximately time 5 to time 15.

INVENTOR.
MATTHEUS JOHANNES MARTINUS COPPENS
BY
Wolfe, Hubbard, Leydig, Voit & Osann
ATTORNEYS.

3,729,983

LEAK TIGHTNESS TESTING METHOD AND APPARATUS

BACKGROUND OF THE INVENTION

The present invention relates generally to leak tightness testing methods and apparatus and more particularly, to improved methods and apparatus for testing the integrity against leakage of fluids through the walls, seams or joints of the article to be tested which is characterized by the rapidity and reliability of the test to determine the presence of a leak yet wherein such detection is capable of determining even minute seepage or diffusion through faults in relatively short periods of time.

Leak tightness testing of containers, vessels, closing devices, diaphragms, and the like is of considerable importance to manufacturers and users of such products as initially produced as well as those products which are refilled or reused several times over the product life. In shipping containers, for example, the type commonly used in transporting and storing oil products, and other liquid, semi-liquid, pulvarized, or granular substances may be reused numerous times providing they have not developed a leak during the transportation, storage and use normally encountered therewith. The problem also exists in pressure vessels or bottles, such for example, the type utilized for liquefied petroleum gas (LPG) that may be of the oneway type or the refillable type. However, in either instance, it is highly important that they be tested for leaks or seepage that could develop into a leak prior to placement in service. The reason for this is that pressurized substances as well as certain solvents or inflammable fluids are extremely hazardous from the viewpoint of leakage whether in the hands of the manufacturer, supplier or consumer.

Numerous techniques have heretofore been applied for determining the leak tight integrity of containers and the like, but they are subject to disadvantages especially when attempting to ascertain minute leaks or seepages which might occur in seams, wall-joints or even areas of weakness that may have occurred during handling or transportation. Gross leaks may be determined by visual inspection aided either by filling with water, or filling with a gas under pressure and immersing in water. Visual inspection has also been accomplished by building up gas pressure within the article aided with a soap solution spread over the article or merely by detection of loss of pressure with a gage. Where relatively small leaks are involved, these techniques are not suitable due to the rudimentary nature of tests and the amount if time necessary to complete them.

One approach which has heretofore been used involves placing the article to be tested in a sealed enclosure with the pressure on one side of the article being higher than atmospheric pressure. The higher pressure space includes a suitable gas which may be detected by a detector apparatus. The gas, for example, may be nitrous oxide and the apparatus used for detection may, for example, be of the infra red spectra analysis type which is capable of measuring the concentration of a gas by recording the optical absorption in the infra red spectrum. The aforementioned system operates with the confined article to be tested separating the detectable gas in the higher pressure side from the atmospheric pressure in the space provided on the side between the article and the enclosure. After a sufficient period of time has passed to allow for traces of gas to pass into the lower pressure space, it is evacuated into the testing apparatus to ascertain by the presence of the detectable gas whether any leakage has occurred. Such a system presents certain disadvantages in that it takes a fairly long period of time before being capable of determining the presence of a small leak since evacuation of the space in which traces of the detectable gas should appear results in a dilution of the volume presented to the detector and small amounts of traces of gas may not reach the detector apparatus at all. Thus, very slight leakages may not be determined with such an arrangement.

Another approach to the problem of leak testing of containers like articles and the like involves placing the article again containing the detectable gas under pressure in a covering which is generally bellows-shaped and after a predetermined period of time has passed, the atmosphere surrounding the article within the covering is passed to the testing apparatus by compression of the bellows-shaped covering. This arrangement also has certain disadvantages in that the compressible covering must be a considerably greater volume than the space taken up by the article to be tested which again results in some insensitivity due to the volume of air within the covering in which any trace gas passing from a leak will be dispersed. In addition, a significantly higher pressure must be built up within the article to create the necessary differential for diffusion of the tracer gas through a fault into the covering space which is at atmospheric pressure.

Accordingly, it is the general aim of the present invention to provide methods and apparatus which overcome all of the foregoing disadvantages and which are characterized by their ability to more rapidly and reliably leak test articles even where very small leaks are involved. While not so limited in its application, the invention will find an advantageous use in connection with leak testing of metal shipping containers or drums.

Another object of the invention is to provide improved leak testing methods and apparatus which are extremely versatile and capable of being utilized for a wide variety of articles and yet may be particularly suitable for use in automated lines for testing on a mass basis.

In another of its important aspects, it is an object of the invention to provide improved methods and apparatus for leak tightness testing of containers and the like employing a tracer detection arrangement wherein extremely small container leaks may be ascertained with a minimum time involved for performing the test yet with highly reliable results obtained as well as the ability to pass even very small traces of gas permeating through a leak to the detector apparatus.

An ancillary object of the invention is to provide an improved leak tightness testing apparatus which is relatively simple and may be easily manufactured utilizing readily available and procurable components. It is yet another object of the invention to provide apparatus which permits recycling of the detectable tracer gas for use with testing of numerous containers or similar articles being tested.

Other objects and advantages of the invention will become apparent as the following description proceeds, taken in conjunction with the accompanying drawings in which:

FIG. 1 is a diagrammatic representation of an exemplary leak tightness testing system in accordance with the present invention;

FIG. 2 is a graphical representation of a timing diagram for the apparatus illustrated in FIG. 1.

Figure 3:
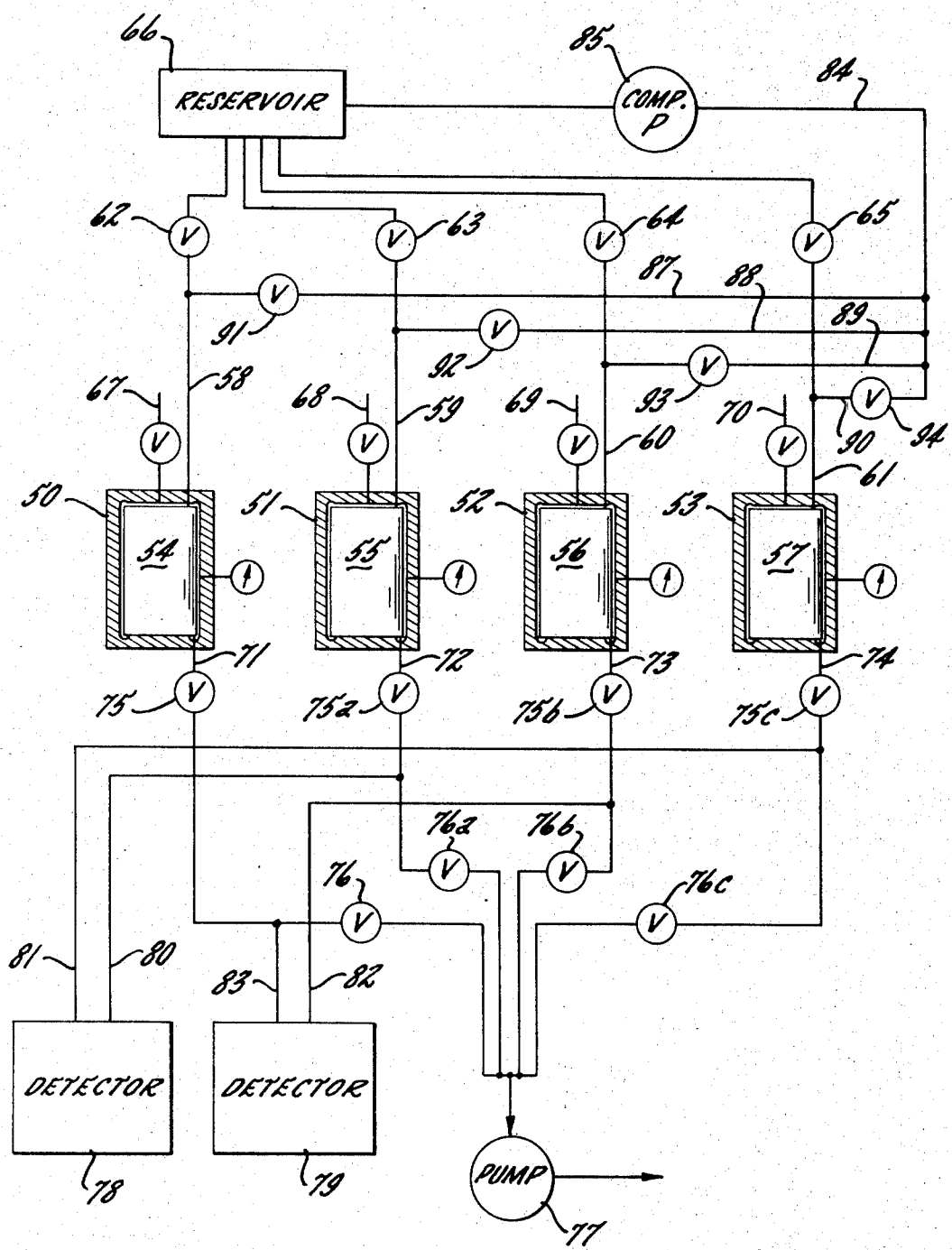
FIG. 3 is a diagrammatic representation of a multiple station leak tightness testing system which is particularly suitable for testing of a number of articles on a mass testing basis and in accordance with the present invention.

While the invention is susceptible of various modifications and alternative forms, specific embodiments thereof have been shown by way of example and will herein be described in detail. It should be understood, however, that it is not intended to limit the invention to the particular forms disclosed, but, on the contrary, the intention is to cover all modifications, equivalents and alternatives that fall within the spirit and scope of the invention.

Referring now to the drawings, there is shown in FIG. 1 an exemplary leak tightness testing apparatus, generally indicated at 10, which is particularly suited for testing the integrity against leaks of the shipping container or drum 12 in accordance with the present invention. As best shown in FIG. 1, the exemplary apparatus 10 includes an enclosure or covering 14 adapted to receive the drum 12 or similar article to be tested, the arrangement being such that the enclosure 14 may be completely sealed in respect to the surrounding atmosphere. Only a relatively narrow space or envelope 15 exists between the outer surfaces of the drum 12 and the inner surfaces of the enclosure 14.

For the purpose of enabling filling of the drum 12 with a suitable gas to be used in connection with the determination of leaks in the drum, there is provided an inlet conduit 16 having disposed therein a valve 18 with the conduit extending through the upper end of the enclosure 14 and into a bung hole opening 20 or the like at the top of the drum. It will be appreciated by those skilled in the art that appropriate seals (not shown) are provided between the conduit 16, enclosure opening 17, and the bung opening 20 into the drum 12. The opposite end of the conduit 16 is connected to a reservoir 19 supplied with air and the detectable gas from a suitable source (not shown).

As the ensuring discussion proceeds, it will be apparent that the drum or article can be placed into the enclosure already filled with or containing the detectable gas under pressure in which case it is unnecessary to provide the apparatus with the gas filling arrangement discussed above. This, the testing of bottles such as the type employed with liquefied petroleum may have the detectable gas added during the regular filling operation and thereafter can be tested anytime according to the present invention.

The particular type of detectable gas utilized is not critical to the present invention and any gas such as $N_2O$, $CO_2$, $C_2H_2$, $C_2H_3$, $CH_4$, $CO$ and various other gases which depending upon the particular circumstances of the application and type of detector apparatus being utilized is merely a matter of choice.

In order to provide for detection of the tracer gas selected, there is provided a detector apparatus (FIG. 1) generally indicated at 22. In the present instance, the exemplary detector apparatus illustrated is of the infra red spectra analysis type which detects and measures the concentration of the tracer gas by recording its absorption in the infra red spectrum. Such apparatus is commercially available as off-the-shelf items. Of course, other forms of detector apparatus may be utilized, such for example, as the arrangement disclosed in U.S. Pat. No. 2,645,117 which makes use of the change in value of a resistance in a Wheatstone bridge when the detectable gas is brought into contact with the resistance. The detector apparatus 22 as illustrated in FIG. 1 includes a pair of test columns or tubes 24, 26 respectively which as more fully described hereinafter below provide for an initial sample of the envelope 15 to be taken so that a comparison can be made with the test sample thereby assuring that reliable results are obtained. Each of the tubes 24 and 26 are provided with inlet valves 28, 30 respectively coupled to a pipe 32. The pipe 32 is connected to an inlet conduit 34 one end of which passes into the envelope 15 of enclosure 14.

In order to provide for evacuation of the envelope 15 as well as one or both the test columns 24, 26 there is provided a vacuum pump 36 connected to conduit 34. A valve 38 is interposed in the conduit 34 to provide for sealing and unsealing the passageway of the conduit from the envelope and the detector and pump. Valve 40 interposed in conduit 34 between the pump and the connection pipe 32 to conduit 34 enables connection and disconnection of the passageway through the conduit to the pump.

In carrying out the present invention, provision is made for flushing the entire contents of envelope 15 into one of the detector test columns after the envelope has been first evacuated and a sufficient period of time has passed for any traces of detectable tracer gas from the drum can be present In keeping with one of the important aspects of the present invention, the envelope is preferably dimensioned such that its entire volume is substantially the same as or less than the volume of the detector column so the entire contents of the envelope can be accommodated by the detector without dilution of the test volume. To this end there is provided an inlet pipe 42 which passes into the envelope space 15 through covering 14 adjacent the top thereof. A valve 44 interposed in conduit 42 permits sealing and unsealing of the passageway through the conduit to the envelope. The free end of conduit 42 as shown in FIG. 1 may be open to the atmosphere or alternatively it may be connected to a source of suitable gaseous medium such as air under pressure which gas is inert with respect to the detectable tracer gas. The flushing conduit 42 and the outlet conduit 34 are preferably disposed at opposite ends of the envelope to insure that the flushing gas cannot pass directly to the outlet conduit 42.

For the purpose of removing the detectable tracer gas from the drum after completion of the test there is provided a pipe 46 having a valve 47 therein coupled to conduit 16.

Preferably, provision is made for determining the presence of gross leaks in the article or drum before it is filled with the detectable gas to avoid any unnecessary waste of the gas. Thus, in the exemplary arrangement a pressure gage 21 or any other suitable pressure sensing device is connected to the envelope 15 to provide an indication that the desired evacuated pressure is being held in the envelope.

In order to more fully understand the mode of operation of the exemplary leak testing apparatus 10 as well as the method of the present invention, reference is now made to FIG. 2 wherein there is shown a timing diagram for the basic cycle of operation for the system. Prior to initiation of the test operation, a drum 12 is first placed into the enclosure 14 which is then effectively sealed off from the surrounding atmosphere. All of the valves 18, 30, 40, 44, and 47 are closed. Valves 28 and 38 are open so that the placement of the drum into the envelope causes some of the air in the envelope to pass into the detector tube 24 which will be at atmospheric pressure. This also provides for a sample of the gas in the envelope at the inception of the test for comparison purposes with the sample subsequently to be tested assuring that reliable results are obtained for each test. Valve 28 to detector tube 24 is then closed and the apparatus is now in readiness for a test operation in accordance with the present invention.

In order to initiate the testing operation, referring to FIGS. 1 and 2, conjointly, valves 30 and 40 are opened coupling the pump 36 to conduit 34 thereby evacuating the envelope 15 and the second detector tube 26. At about the same time, valve 18 may be opened provided that no gross leaks have been sensed by pressure gage 21, and a mixture of the detectable gas and air flows into the drum 12 from reservoir 19. Valves 28, 44 and 47 remain closed. When a sufficient degree of vacuum has been drawn and held in the envelope which occurs after a predetermined time depending upon the volume of the envelope and the capacity of the vacuum pump, valve 38 is closed. The n pump 36 is still operated to evacuate the detector tube 26 to a still lower pressure. At about the same time valve 18 is closed since the pressure in the drum will have achieved a sufficiently high enough pressure for the test purposes. Shortly thereafter, valves 30 and 40 will be closed to disconnect the pump and seal off the test column 26 at its now lower pressure.

When the valve 38 has been closed the waiting time for allowing any detectable gas to pass through any drum leak has begun. During this time too, a check may be made for larger leaks by taking pressure measurements in the envelope.

In keeping with the invention, at the end of the waiting time, the valves 30, 38 and 44 are opened. Air or other suitable inert gas entering the envelope adjacent the top through conduit 42 flushes out all of the gas present in the envelope causing the latter to flow through conduit 34 and pipe 32 into detector tube 26. The detector apparatus 22 will show if there was a leak when relatively more detectable gas is in tube 26 than in tube 24. During this time valve 47 in conduit 46 opens to release the pressure and detectable gas remaining in the drum to restore it to atmospheric pressure for removal from the enclosure. The gas in the drum may be discharged to the atmosphere or provision may be made for returning it to the reservoir 19 for reuse in a subsequent test.

Upon completion of the flush and restoration of the drum pressure to atmospheric pressure, valves 30, 44 and 47 are closed thus returning the testing apparatus to its initial state in readiness for a subsequent testing operation on the next drum. The drum 12 may now be removed from the enclosure and a next drum to be tested placed in the enclosure. While the drum changing takes place, the detector apparatus 22 completes its determination as to whether or not any leaks are present.

Referring now to FIG. 3, a multiple station testing arrangement has been depicted. In this instance, the exemplary arrangement which enables leak tightness testing of drums or the like on a high speed production basis includes a plurality of enclosures 50-53, there being four in number to enable testing of drums 54-57, respectively. Each enclosure has an inlet conduit 58-61 with respective valves 62-65 for filling the drums with the detectable gas from reservoir 66. Flushing conduits 67-70, also having valves therein, are provided adjacent to the top of each of the enclosures.

Outlet conduits 71-74 for each of the enclosures, each having a pair of valves 75,76 (a-c) contained therein couple the enclosures to a single vacuum pump 77 for evacuating the envelopes surrounding the drums.

For the purpose of analyzing the gases of each of the enclosure envelopes, there is in this instance provided a pair of detectors 78, 79 similar to the detector 22 of FIG. 1. Since the exemplary system of FIG. 3 utilizes two detectors, pipes 80, 81 connect detector 78 to conduits 72, 74 of enclosure 51, 53, respectively, and detector 79 through pipes 82, 83 is connected to enclosures 50, 52 via respective conduits 71, 73. This arrangement permits sequential operation of the system by testing and loading and unloading drums taken two at a time.

For the purpose of removing the detectable gas from the drums after the test thereby restoring the internal pressure to atmospheric pressure and recycling the detectable gas back to the reservoir 66 there is provided a pipe line 84 having a compressor pump 85 interposed therein with the pipe line 84 being attached via individual pipes 87-90 connected respectively to inlet conduits 58-61 of the enclosures 50-53. Valves 91-94 interposed in each of the pipes 87-90, respectively, permit closing-off of the return lines to the suction side of the pump 85.

Keeping in mind the previous operational description of the apparatus 10 shown by way of example in FIG. 1, it will be appreciated that a typical cycle of operation of two of the test enclosures will be the same as described for FIG. 1, each test station operating with one of the detectors 78 and 79. To this end, at initial start-up with a drum loaded in each of the enclosures, all of the valves will be closed except valves 75, 75a in outlet conduits 71,72 and the valves for one of the test columns in each of the detectors (not shown). Valves 75b and 75c of enclosures 52 and 53 are closed since in this instance they are not involved in the initial test. The valves of the aforesaid ones of the test columns in each of the detectors are closed and valves 76 and 62 of enclosure 50 as well as valve 76a and 63 of enclosure 51 are opened. Also, the valves for the other test columns of each of the detectors 78, 79 are opened.

Thus, simultaneous filling of drums 54 and 55 occurs with the evacuation of the envelopes of enclosures 50 and 51 and the two test columns of detectors 78 and 79. When the appropriate degree of vacuum in enclosures 50, 51 is reached and the drums 54, 55 are filled with the detectable gas, valves 62,63, 75 and 75a are closed. Valves 76 and 76a remain open as do the valves to the test columns until the latter are evacuated to a lower pressure than the envelopes of enclosures 50 and 51, after which these valves are closed. Upon completion of the waiting time for the test, valves 67 and 68, 75 and 75a are all opened to flush the gas in envelopes of enclosures 50 and 51 to their respective test columns. Valves 91 and 92 are opened at this time to return the detectable gas and their respective enclosures 52 and 53 may be evacuated in readiness for completion of the test therewith as soon as the detectors are free from the test conducted on drums 54 and 55.

After completion of the test on the first two drums valves 91 and 92 are closed and drums 54 and 55 can be removed with two new drums being placed in the enclosures 50 and 51 to be prepared for the next sequence. In the meantime, assuming that the detectors 78, 79 have been cleared, the same test procedure can be followed with respect to the drums 56 and 57 in enclosures 52 and 53.

It will be appreciated from the foregoing that there has herein been disclosed relatively simple and reliable methods and apparatus which are highly effective in leak testing metal shipping containers or drums on a high speed production basis. This advantageous result is achieved by the complete flushing of the envelope surrounding the drum into the detector test column so that any traces of the detectable gas that might have filtered through even a very small leak in the container walls, joints or seams may be sensed by the detector apparatus. When utilizing a detector which can sense differences of 10 to 100 ppm of detectable gas, such as nitrous oxide in air, the present system is able to detect leaks on the order of one cubic centimeter/minute across a pressure difference of one atmosphere.

The method and apparatus in accordance with the present invention may also be applied with numerous other articles besides containers or drums without departing from the invention. Thus, in accordance with the present method, the tightness of an article wall, weld seam or the like can be tested by confining the article in an enclosed space, providing a detectable gas under pressure in the portion of the space on one side of the article and after a sufficient predetermined time has passed for any gas to permeate through a leak has taken place, then flushing the gas contents from the evacuated space side into a detector apparatus.

I claim as my invention:

1. The method of leak tightness testing of articles wherein a closed space containing a pressurized detectable gas is presented adjacent one side of the article and an enclosed space is adjacent to the opposite side of the article, comprising the steps of, evacuating said enclosed space adjacent said opposite side of the article to a pressure lower than the pressure in the space adjacent the side of the article containing the detectable gas, permitting the passage of a sufficient predetermined time to allow said detectable gas to permeate through leaks in said article, and then thereafter flushing the gaseous contents from said previously evacuated space by introduction of a gaseous medium inert to the detectable gas and at a pressure higher than the pressure to which said space was evacuated, directing the flushed contents of said evacuated space to the detector apparatus for determining the presence of said detectable gas as an indication of a leak in the article, and evacuating the detector apparatus to a lower pressure than that of the evacuated space adjacent said article before directing the flushed contents of the evacuated space to the detector apparatus.

2. The method of leak tightness testing of articles wherein a closed space containing a pressurized detectable gas is presented adjacent one side of the article and an enclosed space is adjacent to the opposite side of the article, comprising the steps of, evacuating said enclosed space adjacent said opposite side of the article to a pressure lower than the pressure in the space adjacent the side of the article containing the detectable gas, permitting the passage of a sufficient predetermined time to allow said detectable gas to permeate through leaks in said article, and then thereafter flushing the gaseous contents from said previously evacuated space by introduction of a gaseous medium inert to the detectable gas and at a pressure higher than the pressure to which said space was evacuated, and introducing at least a portion of the contents evacuated from said space adjacent said article as a reference sample into the detector apparatus for subsequent comparison with said flushed contents received from said evacuated space as the test sample.

3. The method of leak tightness testing of metal drums and the like, comprising the steps of, placing said drum into an enclosure wherein a closed space is defined between the inner walls of the enclosure and the outer walls of the drum, evacuating said closed space between said enclosure and said drum to a first pressure, filling said drum with a detectable gas from a source to a second pressure, within said drum higher than said first pressure in the closed space, allowing a predetermined time to pass for traces of the detectable gas to permeate through a leak in said drum into said evacuated closed space, flushing the contents of said evacuated space by introduction of a gaseous medium inert to the detectable gas and at a third pressure higher than the first pressure of said evacuated space and directing said flushed contents of the evacuated space into a detection apparatus for determination of traces of the detectable gas indicative of a leak.

4. A method in accordance with claim 3 wherein said detection apparatus is evacuated to a fourth pressure lower than the first pressure to which said space is evacuated prior to receiving the flushed contents from said evacuated space.

5. A method in accordance with claim 3 wherein substantially all the remaining portion of said detectable gas in said drum is returned to said source.

6. A method in accordance with claim 4 wherein at least a portion of the contents of said closed space prior to evacuation thereof is directed to said detector for comparison with said flushed contents received by the detector from the evacuated closed space.

7. A method in accordance with claim 3 wherein said closed space is of substantially no greater volume than the detector test volume so that substantially all the contents of the closed space is directed into the detector.

8. Apparatus for leak tightness testing of drums and the like comprising in combination, an enclosure adapted to sealingly receive said drum, said enclosure being dimensioned such that a closed space is defined between the drum and enclosure, a source of detectable gas, means for filling said drum in said enclosure with said detectable gas, detector means for determining the presence of said detectable gas, sealable passage means connecting said detector with said closed space, means for evacuating the contents of said closed space to a pressure lower than the pressure of said detectable gas within the drum, means for flushing the contents of said evacuated space into the detector means by introduction of a gaseous medium inert to the detectable gas and at a pressure higher than the pressure of the evacuated space, and means for coupling said evacuating means with the detector so that said detector may be evacuated along with said closed space.

9. Apparatus as claimed in claim 8 including means for disconnecting said evacuating means from said closed space while retaining the connection between the vacuum source and said detector means so that the latter is evacuated to a lower pressure than the pressure in said closed space.

10. Apparatus for leak tightness testing of drums and the like, comprising, in combination a plurality of enclosures adapted to sealingly received individual drums, said enclosures being dimensioned such that a space is defined between the drums contained therein and the enclosures, a source of detectable gas, means for selectively filling said drums in said enclosures with said detectable gas, a plurality of detector means for determining the presence of said detectable gas, sealable passage means connecting said detectors with said enclosure spaces, means for selectively evacuating the contents of said enclosure spaces to pressures lower than the pressures of said detectable gas with the drums, means for selectively flushing the contents of individual ones of said evacuated spaces into different ones of said detector means by introduction of a gaseous media inert to the detectable gas and a pressure higher than the pressure of the evacuated space and means for sequentially testing certain ones of said drums and changing the remaining drums for subsequent tests.

11. Apparatus as claimed in claim 10 including means for selectively returning the substantially all remaining portions of said detector gas from said drums to said source.

* * * * *